United States Patent [19]
Ma

[11] Patent Number: 5,933,641
[45] Date of Patent: Aug. 3, 1999

[54] NUMERIC INTENSIVE REAL-TIME SOFTWARE DEVELOPMENT SYSTEM

[75] Inventor: Wei Ma, Singapore, Singapore

[73] Assignee: Tritech Microelectronics International, Ltd., Singapore, Singapore

[21] Appl. No.: 08/823,528

[22] Filed: Mar. 24, 1997

[51] Int. Cl.$^6$ ....................................................... G06F 9/44
[52] U.S. Cl. .......................... 395/705; 395/701; 395/704; 395/710; 395/500; 395/183.09; 395/183.14; 395/183.22
[58] Field of Search .................................... 395/701, 704, 395/705, 707, 708, 710, 500, 384, 385, 562, 566, 183.08, 183.09, 183.14, 183.22, 183.01

[56] References Cited

U.S. PATENT DOCUMENTS

| | | | |
|---|---|---|---|
| 5,265,254 | 11/1993 | Blasciak et al. | 395/704 |
| 5,375,228 | 12/1994 | Leary et al. | 395/183.09 |
| 5,450,586 | 9/1995 | Kuzara et al. | 395/704 |
| 5,724,272 | 3/1998 | Mitchell et al. | 702/123 |

OTHER PUBLICATIONS

"Mwaye", from IBM Internet, (IBM.com) 5 pages, not dated.
Powell et al., "Direct Synthesis of Optimized DSP Assembly Code from Signal Flow Block Diagrams," IEEE International Conference on Acoustics, Speech, and Signal Processing, ICASSP–92, vol. 5, pp. 553–556, Mar. 1992.

*Primary Examiner*—Tariq R. Hafiz
*Assistant Examiner*—Tuan Q. Dam
*Attorney, Agent, or Firm*—George O. Saile; Stephen B. Ackerman

[57] ABSTRACT

This invention describes a numeric intensive real-time software development system for programming low cost fixed point digital signal processors (DSP's) and other programmable devices in which code efficiency, ease of programming and code portability are maintained. DSP's being a generic math engine are proliferating into many areas, far beyond the traditional filtering applications. Numeric intensive is the most distinctive nature of the DSP software, and one of the biggest challenges in DSP software development is to implement complicated math algorithms in low cost fixed-point DSP's. The software development system describes an approach where low level assembly language is enhanced with high level syntax and further augmented with an enhance numeric handler for converting between numeric formats. Debug of the DSP programs is aided by the numeric format conversion and the use of high level syntax. The resulting program is written to a driver interface which facilitates porting code between different DSP's.

16 Claims, 4 Drawing Sheets

NUMERIC INTENSIVE REAL-TIME SOFTWARE DEVELOPMENT SYSTEM

BACKGROUND OF THE INVENTION

1. Field of Invention

This invention relates to a software development system for digital signal processors (DSP), in particular fixed point DSP's and other programmable devices for the ease of programming, debug, and porting of code to other brands and types of digital signal processors.

2. Description of Related Art

There are several existing software development tools available for particular brands or types of DSP's. The trend in the architecture of these tools is to migrate to high level language for ease of programming, such as C language. C language compilers can deal well with numeric behaviors but are inefficient in real-time code generation and the usage of memory. Another approach is to program DSP's in low level language, such as assembly language. The low level language can handle real-time behaviors and achieve the best optimized code. However, the low level language has difficulty handling numeric behaviors and is difficult to debug causing long development time. In addition there is a growing need to produce code that can be ported to DSP's of different manufacturers and other general purpose programmable devices, such as RISC or CISC microprocessors. This entails considerable rewrite to adjust to a different architecture. Coupled with this is the need to translate digital formats during code development and debug. This is particularly acute for a fixed point processor that is dealing with floating point operations and usually requires tedious time consuming conversions during debug using a hand calculator or the equivalent to check whether the correct data is being generated. In addition code developed in DSP assembly language is time consuming and using a higher level language, like C programming language, for a fixed point DSP can create problems because of inconsistent code optimization and truncation error. Referring to In U.S. Pat. No. 5,375,228 (Leary et al.) is described an emulation system to debug software for a DSP. This is an application dependent configuration which integrates a digital signal analyzer into a specific DSP emulation system and does not appear easily portable to other configurations..

Commercial vendors for DSP products, such as IBM which sells its DSP under the brand name "Mwave", provide development tool kits for programming and debug of application software to run their DSP. The tool kit allows programming in C language or in assembly language, and real time debugging with data being displayed on the computer system monitor. As with other vendors, this tool kit does not provide the capability to easily port code for use with other types and makes of DSP's.

Existing development tools are available for a single type DSP and do not provide a universal capability that can easily produce code for various DSP types and brands. Thus the porting of code to other brand of DSP entails a considerable rewrite and additional debug. Working with fixed point DSP's requires a considerable amount of effort in the debug phase to manually convert to other numerical formats that are used in the program by using hand calculators or equivalent. After a program is written and found to be useful, it is often a time consuming and difficult task to adapt the code for another DSP. Determining which floating point, decimal and thirty-two bit formats were intended for an integer DSP program is difficult especially when it is not being done by the original programmer. For situations where various types and brands of DSP are being used, there is a need for a universal programming environment which allows for easy debug and porting of code.

There are currently two common approaches in developing DSP software. One is to use high level language tools, such as C-language. Numerous C compilers can deal well with numeric behaviors but are not as efficient in real-time code-generation as well as memory usage. The second approach is to use low level language tools, such as assembly language. The low level language can handle real-time behaviors and achieved the most optimized implementation, but has difficulty handling numeric behaviors that in turn cause a long development time. Recently, there has been considerable effort focused on adding more real-time control tools to high level language compilers. This makes the high level language compiler very complicated, and yields little improvement to new algorithms; therefore, a lot of embedded applications are still developed by using assembly languages. Numeric software bugs are normally manifested through inaccuracy in numeric analysis or large scale collective analysis, such as LMS, waveform, and spectrum analysis, and the debugging involves large amounts of mathematical analysis, including the conversion from one data format to another.

SUMMARY OF THE INVENTION

The invention describes an universal software development system for developing and debugging real-time digital signal processing software on programmable devices, such as digital signal processors (DSP) or microprocessors. Digital signal processors are fast becoming a generic math engine and are proliferating into many areas, far beyond the traditional filtering applications. Implementing complicated math algorithms in low cost fixed-point DSP's has become one of the biggest challenges in DSP software development. A software development system as described herein provides a new concept in DSP software development. Through leveraging the nature of numeric intensive in all digital signal processing applications, the development software system can significantly improve the efficiency of numeric intensive real-time software development across different hardware platforms.

The numeric intensive real-time software development system of this invention is based on low level assembly language with extensive native mathematical representation formats and high level syntax. The combination of low level tools and high level syntax is called DSP-C. It possesses both the advantages of handling numeric mathematics through an enhanced numeric handler and optimization for code speed and compactness in low level assembly language. Moreover, the software development system is generic for all DSP's and microprocessors since the code is written to a driver interface. When the target processor is changed, only the low level development tools and drivers need to change. Thus porting code from one DSP to another is a relatively easy task. All math utilities are focused on low level native DSP environment and on-line performance. Debugging DSP software is made easy because all data in the physical hardware has been converted into native mathematics representation and displayed on a computer screen. Code developed in the numeric intensive real-time software development system is coupled to a hardware DSP through a set of drivers and a physical interface. The drivers are unique to each different type of DSP and provide a means by which the same code development methodology can be used for different DSP's. Thus a single programming effort can be used for different brands and types of DSP's. When there are no DSP's available to debug the software against, a DSP software simulator can be automatically selected. It is connected through a set of drivers and uses the assembly language library functions to do the simulation, following the behavior of the hardware architecture and producing in the simulation the same as in real mode.

In fixed point DSP programming, programmers are continuously faced with the problem of using limited hardware capability to represent unlimited mathematical operations. To help this problem it is convenient to be able to display to a programmer DSP numerical data in various formats other than the fixed point integer format of the DSP. An important concept in the invention is to separate the logical data presentation from physical hardware data through a format mapping function. This in not a complicated function to implement since the conversions of formats are straight forward, and is provided by an enhanced numeric handler. By identifying all necessary formats and providing them for the programmer's, selection, it gives the programmer the capability to view data in all formats and to search for a meaningful mathematical presentation and format. In debugging a program the programmer can view data logically, as intended in the program, instead of physically as stored in the physical structure of the DSP.

The programmer interfaces the software development system through a user interface providing a display of data in a graphics or text format. The user interface connects to the assembly language enhanced with high level syntax and the enhanced numeric handler to produce code and make modifications. DSP control commands for the target DSP are connected from the user interface to the set of drivers. These commands provide control information for the DSP's connected to the drivers such as start, stop, and single step. Status of the target DSP is connected back to the user interface from the drivers communicating a hardware description file which provides a behavioral description of the target DSP connected to the set of drivers. Register and memory data of an operating DSP is fed back to the user interface from a target DSP through a dissembler and an enhanced numeric handler and the high level syntax function. This provides real-time operating status of the target DSP and facilitates making real-time program changes. Thus a programmer can program a DSP, initiate execution of the program on a target DSP, watch the resulting execution of the program and make changes to the program to correct problems as they occur.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
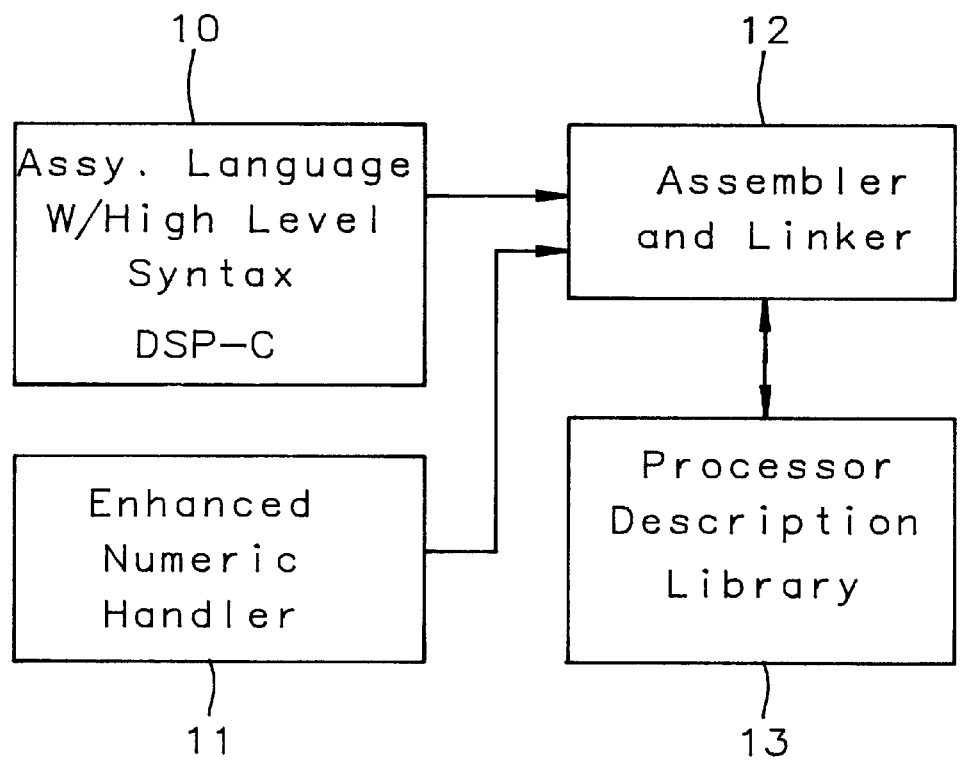
FIG. 1 is a diagram of the software programming environment of the invention.

In FIG. 1 is shown the programming tools needed to produce code for a DSP using the numeric intensive real-time software development system of the invention. The approach presented herein takes a different direction than that taken by most DSP program development tools. In this invention low level assembly language provides the foundation for programming which is augmented with high level language syntax 10. The assembly language efficiently handles real-time behaviors and achieves the most optimized implementation of the resulting code. The high level language syntax provides an efficient way to handle numeric behaviors. This combination of low level assembly language enhanced with high level syntax 10 is called DSP-C. The DSP-C 10 along with an enhanced numeric handler 11 is connected to an assembler and linker 12. The enhanced numeric handler 11 converts a number into the logical format used by the program from the physical presentation in the target hardware, and allows conversion between various logical numeric formats such as floating point, decimal and hexadecimal. Also connected to the assembler and Linker 12 is a description library 13. The description library 13 provides key information about the internal architecture of the DSP, or microprocessor, being programmed.

Figure 2:
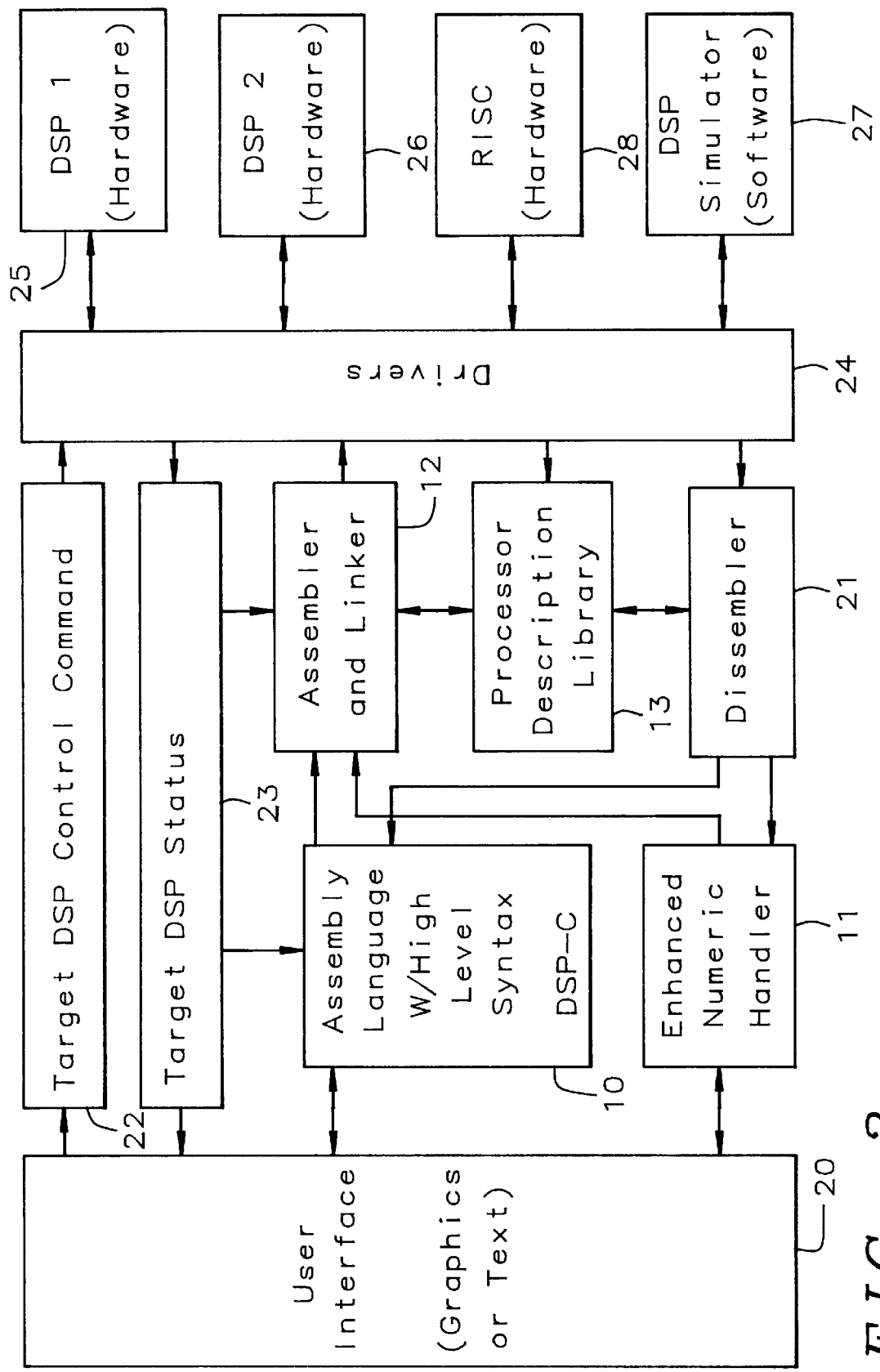
FIG. 2 is a diagram of the numeric intensive real-time software development system of the invention.

Referring to FIG. 2, a diagram of the numeric intensive real-time software system is shown. Embedded within this diagram are the elements 10, 11, 12 and 13 of FIG. 1. The user interface 20 provides a graphics or text presentation of information to the programmer and allows the programmer to communicate with the rest of the system. The DSP-C 10 is connected to the user interface 20 and allows the programmer to program a DSP using the high level syntax of DSP-C coupled with the low level assembly language. A dissembler 21 connects DSP program instructions back from a target DSP 25 through the drivers 24 to the DSP-C 10 for further connection to the user interface 20 and for viewing by the programmer. Each DSP type 25 26, or other programmable device 28 intended for use in numeric compute applications, has a different driver 24 unique to the particular DSP 25 26, or other programmable devices like a RISC processor 28. The dissembler 21 connects register and memory numeric data to the enhanced numeric handler 11 to be converted from the fixed point integer format of the DSP 25 to the logical format of the program for display on the user interface. Upon command by the programmer, the enhanced numeric handler 11 converts the DSP 25 numeric data from one format to another. The description library 13 provides key information about the architecture of the DSP 25 26 and other programmable devices 28 to the dissembler 21 to provide proper structure of the dissembled data.

Continuing to refer to FIG. 2, the drivers 24 provide an interface to which the DSP-C 10 programs are written. This driver interface provides a means to accommodate various target hardware and target processors 25 26 27. Thus, the user of the development system described herein is provided an universal debugging environment, a numeric analysis facility 11, language syntax and code generation 10, and testing facility for all DSP's 25 26 and microprocessors 28. Since all necessary differences have been removed, the user can focus on the architectural related differences to make the overall code porting task much easier. To achieve this, the drivers 24 contain various sets to be used for different target processor platforms. DSP control commands 22 from the user interface 20 are connected to a particular DSP 25 through the drivers 24. The control commands 22 provide such commands as run, stop, single step and which DSP 25 to activate. The target DSP status 23 communicates a hardware description file which provides a behavioral description of the target DSP 25 to the user interface 20, the DSP-C 10 and the assembler and linker 12. If there are no physical DSP's 25 available for programming and debug, a DSP simulator 27 can be attached to the drivers 24 to assist in the debug of the software. The DSP simulator 27 is a software image that allows the exercising of the code as it would be done in a real DSP 25.

Figure 3:
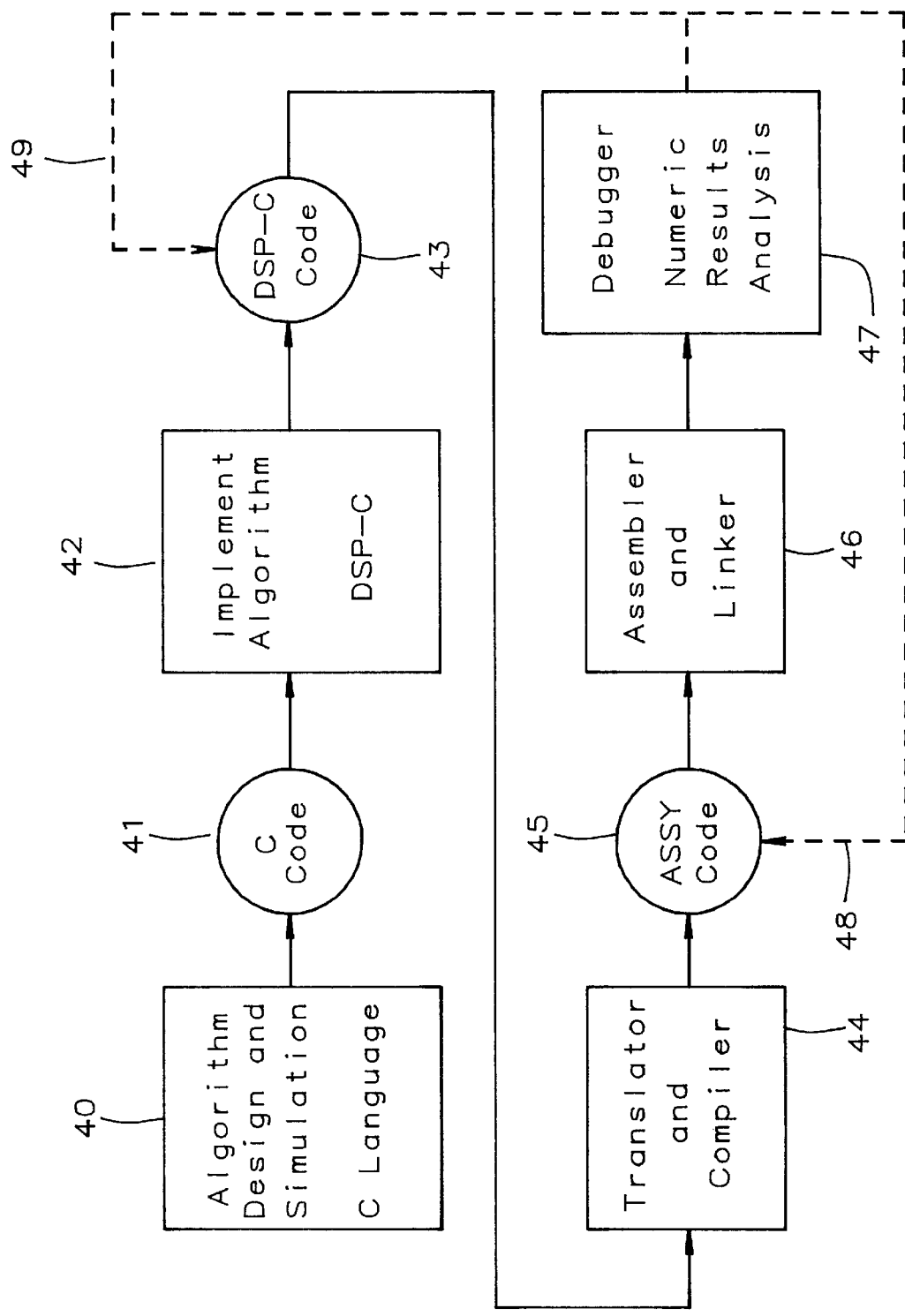
FIG. 3 is a diagram showing the flow of program development and debug of the invention.

In FIG. 3 is shown the diagram of the design flow in programming and debug of a DSP program. Algorithm design and simulation 40 is created in a C language producing C code 41. The C code 41 is fed into the DSP-C 42 to structure the implementation of the algorithm. The result of programming in DSP-C 42 is DSP-C code 43. This DSP-C code is fed through an assembly language translator and compiler 44 to produce assembly code 45. The assembly code 45 is imputed to an assembler and linker to create the final binary form of the of the program to be connected to a physical DSP. A debugger 47 dissembles the output of the assembler and linker 46 for debug purposes and separates the results back into DSP-C level 49 and into native numerical format 48. This translation by the debugger 47 of the final form of the program back into more readable form 48 49 provides a considerable assist to debug of the DSP program.

Figure 4:
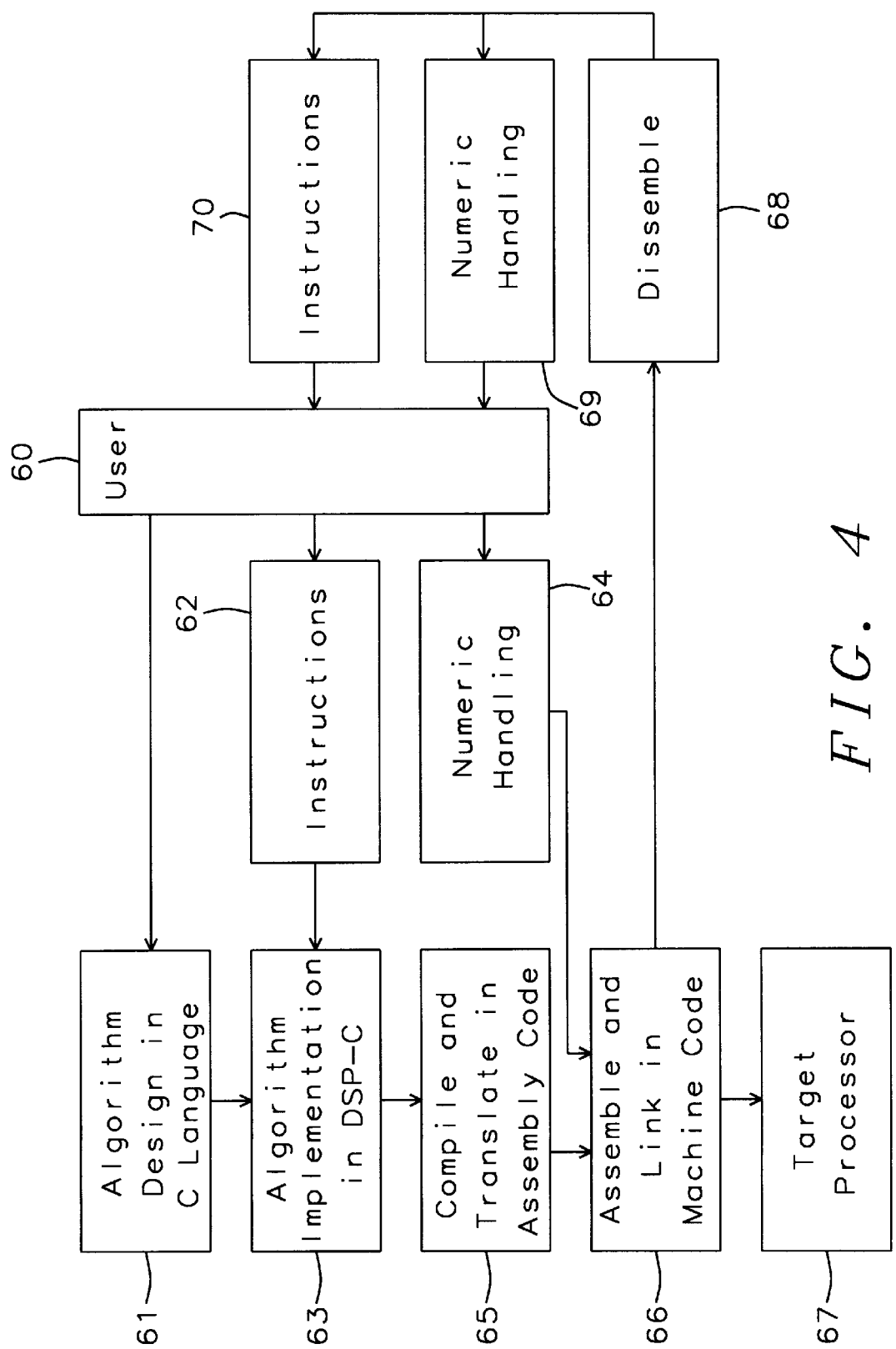
FIG. 4 is a diagram demonstrating a method of use of the invention.

Referring to FIG. 4 a method for programming DSP's and other processors is shown. A user 60 designs an algorithm 61 in "C" language by which a DSP, or target processor, 67 will be controlled by a program. The user 60 develops instructions 62 in DSP-C language to implement the algorithm 63. The DSP-C language is assembly language augmented with high level "C" language syntax. The output from implementing the algorithm 63 in DSP-C is compiled and translated 65 into assembly code and connected to the assembler and linker 66. Through a numeric handling facility 64 the user 60 chooses the data formats to be used with the assembly code. The output of numeric handling facility 64 is also connected to the assembler and linker 66. The assembler and linker produces machine binary code 66 and is connected to a target processor 67. Continuing to refer to FIG. 4, in order to debug the machine binary code, a dissembler 68 translates the output of the assembler and linker 67 back into instructions 70, and the machine numeric digits back into native numeric formats to be displayed through the numeric handling facility 69. The user 60 views the dissembled results 69 70 by means of a visual display and changes any instructions 62 to the implemented algorithm 63. Through numeric handling 64 different numeric formats are viewed by the user 60 to determine the best data format to improve accuracy and resolution. The output of the numeric handling 64 is connected to the assembler and linker 66 to be combined with any changes in the instructions 62 that have been complied and translated 65. The assembler and linker 66 again produces machine level binary code that can be connected to a target processor 67 or fed back to the dissembler 68 for further review.

While the invention has been particularly shown and described with reference to preferred embodiments thereof, it will be understood by those skilled in the art that various changes in form and details may be made without departing from the spirit and scope of the invention.

What is claimed is:

1. A numeric intensive real-time software development system for digital signal processors (DSP) and microprocessors, comprising:

a) A user interface providing text and graphics to a programmer, b) said user interface connected to assembly language, an enhanced numeric handler, DSP status, and DSP control command to provide said programmer with programming and debug capability, c) said assembly language providing DSP instructions to an assembler and linker, d) said enhanced numeric handler connected to said assembler and linker, e) said enhanced numeric handler providing numeric data and format to said assembler and linker converted into DSP executable format, f) said assembler and linker connected to a DSP description library to obtain characteristic data for the DSP type being programmed, g) said assembler and linker providing data and program in native DSP assembly language to a set of drivers to be connected to a specific DSP, h) the DSP control command providing control data from the user interface to the specific DSP through the set of drivers, i) said DSP status connected from the set of drivers to the assembler and linker, the high level syntax and the user interface, j) the set of drivers connecting DSP data to a dissembler and the DSP description library.

k) said dissembler connecting dissembled DSP data and program to the enhanced numeric handler and the assembly language to be presented to the programmer through the user interface.

2. The numeric intensive real-time software development system of claim 1, wherein the DSP programming is based on assembly language to handle real time behaviors and achieve optimized implementation of the DSP program.

3. The numeric intensive real-time software development system of claim 2, wherein DSP assembly language is augmented by the high level syntax for ease of programming and the enhanced numeric handler to assist in numerical format conversion for program debug.

4. The numeric intensive real-time software development system of claim 1, wherein real-time DSP data is fed back to a programmer for debug purposes, comprising:

a) DSP memory resident data and program, and register data connected through a set of drivers to the dissembler, b) the dissembled data and program connected to the high level syntax and the enhanced numeric handler for display to the programmer through the user interface, c) the data format provided by the enhanced numeric handler selected by the programmer, d) the data format changed without affecting any physical data or program in the DSP, e) the data format can be chosen from a menu of a wide range of formats selected from the group consisting of single and double precision, decimal and hexadecimal, and floating point and fixed point.

5. The numeric intensive real-time software development system of claim 1, wherein each different type of DSP is connected to the system through a driver interface, comprising:

a) each set of drivers for different types of DSP's provide an interface to which the assembly language can be developed, b) said interface requiring additional changes only to architectural dependent instructions and low level development tools to be able to port code from one DSP to another, c) multiple driver sets can be connected to the software development system, d) multiple DSP's connected to the multiple drivers at one time, e) an active DSP and compatible driver set can be activated by a target DSP control command, f) said target control command providing DSP selection, start, stop and debug commands, g) said driver set contains DSP hardware description file describing the active DSP architecture, h) the active DSP architecture connected to the assembler, high level syntax and user interface by the target DSP status function, i) in the absence of any physical DSP hardware attached to the drivers, a software simulator is attached to a particular driver set to permit code development.

6. The numeric intensive real-time software development system of claim 1, wherein a DSP can be monitored and controlled in real-time to assist in debug of the DSP program, comprising:

a) an operating DSP continuously monitored through the dissembler and target status connected to the drivers, b) the dissembler providing DSP memory and register data to the programmer through the enhanced numeric handler, c) data and program modifications created by the programmer connected to the DSP hardware through the drivers from the assembler and linker, d) the program modifications routed to the assembler and linker from the high level syntax and enhanced numeric handler, e) results of the modifications are fed back in real-time through the drivers, dissembler and enhanced numeric handler and displayed on the user interface.

7. A real-time software development system for digital signal processors (DSP), comprising:

a) a programming language based on assembly language, b) said assembly language enhanced with numeric representation through means of an enhanced numeric handler, c) said assembly language providing capability to produce efficient code, d) said extensive numeric handler providing means to convert between internal DSP integer format and various numeric formats used by a DSP program, e) said extensive numeric handler providing assistance to programmer during program debug through conversion of the internal DSP integer format to various formats that are used by the program, f) said use of the extensive numeric handler allows the programmer to investigate other numeric formats to provide more accuracy and efficiency.

8. The real-time software development system of claim 7, wherein the C language syntax combined with assembly language produces an improved low level language efficient in real-time code generation that deals well with numeric behaviors.

9. The real-time software development system of claim 7, wherein changing displayed data to other numeric formats assists a programmer in debugging a fixed-point DSP program, comprising:

a) DSP internal data stored in two byte integer format, b) one or more two byte integer segments used to represent numerical data formats used by the DSP program, c) an enhanced numerical handler providing conversion between various data formats, d) said conversion under the selection and control of the programmer, e) said conversion improving program debug by eliminating numerous tedious calculations to convert between formats.

10. A software development system for developing and debugging code for digital signal processor (DSP) programs, comprising:

a) algorithm design and simulation for a DSP program producing C code, b) said algorithm design done in C language to produce a functionally explicit description of the DSP program, c) said C code used as input to implement the algorithm design with numeric representation through means of an enhanced numeric handler, d) an assembly language output from implementing the algorithm design connected to an assembly language translator and compiler, e) the assembly language translator and compiler producing assembly code, f) said assembly code used as input to an assembler and linker, g) an assembled output of the assembler and linker connected to a debugger for numeric results analysis.

11. The software development system of claim 10, wherein program debug is assisted by use of the debugger output, comprising:

a) said debugger dissembles the assembly language code back to DSP-C code for problem analysis, b) said debugger converts DSP numeric data bits back into native numerical format to determine if the correct mathematical operations were performed with the correct accuracy.

12. A method for creating and debugging code for a DSP program, comprising:

a) designing an algorithm, b) creating instructions to implement said algorithm, c) compiling and translating into assembly language code, d) selecting a data format using a numeric handling facility, e) assembling and linking the assembly language code with the data format into machine level binary code for a target processor, f) dissembling the machine level binary code for debug purposes, g) displaying data format through the numeric handling facility, h) displaying program instructions to a user to allow modifications, i) changing program instructions to improve program code, j) viewing different data formats by means of the numeric handling facility, k) selecting a data format to improve data accuracy and resolution, l) re-assembling and re-linking the assembly language code with changes to instruction and data format.

13. The method of claim 12, wherein code can be developed and debugged for other types of processors for numeric applications.

14. The method of claim 12, wherein the numeric handling facility displays various numerical formats to a user to assist in selecting a data format for the program being developed and debugged.

15. The method of claim 12, wherein the DSP-C language is DSP assembly language augmented with "C" language syntax.

16. The method of claim 12, wherein other languages could be used to develop code for the target processor.

* * * * *